United States Patent
Wöhrle et al.

(10) Patent No.: US 10,109,890 B2
(45) Date of Patent: Oct. 23, 2018

(54) LITHIUM CELL HAVING AN ALKALINE-EARTH METAL CARBOXYLATE SEPARATOR

(71) Applicant: Robert Bosch GmbH, Stuttgart (DE)

(72) Inventors: Thomas Wöhrle, München (DE); Felix Eberle, Kyoto (JP); Calin Iulius Wurm, Meitingen (DE); Hideki Ogihara, Haimhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/911,492

(22) PCT Filed: Aug. 4, 2014

(86) PCT No.: PCT/EP2014/066726
§ 371 (c)(1),
(2) Date: Feb. 11, 2016

(87) PCT Pub. No.: WO2015/022223
PCT Pub. Date: Feb. 19, 2015

(65) Prior Publication Data
US 2016/0197380 A1      Jul. 7, 2016

(30) Foreign Application Priority Data

Aug. 16, 2013   (DE) .................. 10 2013 216 302

(51) Int. Cl.
*H01M 4/02*   (2006.01)
*H01M 10/42*   (2006.01)
*H01M 2/16*   (2006.01)
*H01M 10/052*   (2010.01)
*H01M 10/0525*   (2010.01)

(52) U.S. Cl.
CPC ....... *H01M 10/4235* (2013.01); *H01M 2/166* (2013.01); *H01M 2/1646* (2013.01); *H01M 2/1653* (2013.01); *H01M 2/1673* (2013.01); *H01M 2/1686* (2013.01); *H01M 10/052* (2013.01); *H01M 10/0525* (2013.01); *Y02T 10/7011* (2013.01)

(58) Field of Classification Search
CPC .......... H01M 10/4235; H01M 2/1653; H01M 2/166; H01M 10/0525; H01M 2/1646; H01M 2/1673; H01M 2/1686; H01M 10/052; Y02T 10/7011
See application file for complete search history.

(56) References Cited

FOREIGN PATENT DOCUMENTS

| CN | 101124695 A | 2/2008 |
|---|---|---|
| CN | 101425575 A | 5/2009 |
| CN | 101958426 A | 1/2011 |
| DE | 699 00 562 T2 | 5/2002 |

(Continued)

OTHER PUBLICATIONS

International Search Report corresponding to PCT Application No. PCT/EP2014/066726, dated Feb. 3, 2015 (German and English language document) (8 pages).

*Primary Examiner* — Cynthia K Walls
(74) *Attorney, Agent, or Firm* — Maginot, Moore & Beck LLP

(57) ABSTRACT

A lithium cell includes a negative electrode and a positive electrode. In order to increase the safety and service life of the cell, the cell also includes at least one porous protective layer arranged between the negative electrode and the positive electrode. The protective layer includes at least one alkaline-earth metal carboxylate.

20 Claims, 4 Drawing Sheets

(56) References Cited

FOREIGN PATENT DOCUMENTS

| | | |
|---|---|---|
| DE | 601 13 184 T2 | 6/2006 |
| DE | 10 2009 002 680 A1 | 11/2010 |
| EP | 1 146 576 A1 | 10/2001 |
| EP | 1 657 767 A1 | 5/2006 |
| EP | 2 276 098 A1 | 1/2011 |
| JP | 2003-257422 A | 9/2003 |
| JP | 2008-288112 A | 11/2008 |
| WO | 98/59387 A2 | 12/1998 |
| WO | 00/42672 A2 | 7/2000 |

LITHIUM CELL HAVING AN ALKALINE-EARTH METAL CARBOXYLATE SEPARATOR

This application is a 35 U.S.C. § 371 National Stage Application of PCT/EP2014/066726, filed on Aug. 4, 2014, which claims the benefit of priority to Serial No. DE 10 2013 216 302.9, filed on Aug. 16, 2013 in Germany, the disclosures of which are incorporated herein by reference in their entirety.

The present disclosure relates to a lithium cell, to a separator, and to a negative electrode and a positive electrode therefor.

BACKGROUND

The lithium-ion technology is predestined for a broad territory of service applications. Lithium-ion cells, which are also called lithium polymer cells (or lithium-ion polymer cells), especially when they have a laminated aluminum foil packaging, are notable for qualities including high energy densities, specific energies, and an extremely low self-discharge. Lithium-ion cells possess at least one negative electrode (anode) and a positive electrode (cathode), with the ability to perform reversible insertion and removal of lithium ions, this being referred to also as intercalation and deintercalation, respectively. Conductive salt used in lithium-ion cells is mostly lithium hexafluorophosphate ($LiPF_6$).

On account of the high energy densities, both gravimetric and volumetric, of lithium-ion cells, there is particular interest in high intrinsic safety for lithium-ion cells.

For lithium-ion cells, the negative electrode is conventionally divided from the positive electrode by a separator, which is itself an electrical insulator.

Employed very frequently in lithium-ion cells are porous polyolefin separators, which may be polyethylene (PE) or polypropylene (PP) based. In the case of polyolefin separators, however, at temperatures in the region of the softening point of the polymer, the separator may suffer shrinking all around its sides.

Other separators made from high-melting-point polymers, polyimide separators being an example, are indeed more thermally and mechanically stable than polyolefin separators, but in the case of high-capacity cells, of from 40 Ah to 80 Ah, for example, even polyimide separators are not always able to show sufficient intrinsic safety under mechanical or thermal stress.

EP 1 657 767 A1 describes a secondary battery having a porous layer that comprises ceramic particles and a binder and that is applied to at least one of the electrodes of the secondary battery.

DE 10 2009 002 680 A1 describes a ceramic composite material which comprises a polymer film having a regular perforation, the perforation being hidden on at least one side by a porous coating containing ceramic particles.

WO 98/59387 A2 describes an electrochemical cell which comprises calcium carbonate.

WO 00/42672 A2 describes an electrochemical cell which comprises at least one salt of oxalic acid and at least one salt of a carboxylic acid as acid scavengers.

EP 1 146 576 A1 describes a separator for a lithium battery that has a ceramic composite layer and a microporous polymer layer.

SUMMARY

The present disclosure provides a lithium cell which comprises a negative electrode, a positive electrode, and at least one porous layer which is disposed between the negative electrode and the positive electrode and which comprises at least one alkaline-earth metal carboxylate.

A lithium cell may be understood in particular to be an electrochemical cell whose negative electrode (anode) comprises lithium. It may be, for example, a lithium-ion cell, a cell whose negative electrode comprises an intercalation material, graphite for example, into which lithium can be reversibly inserted and removed, or a lithium-metal cell, a cell having a negative electrode composed of metallic lithium or a lithium alloy. More particularly the lithium cell may be a lithium-ion cell.

An alkaline-earth metal carboxylate may be understood in particular to be a salt of a carboxylic acid with a (metal) cation from the second main group.

Advantageously, alkaline-earth metal carboxylates, even in small amounts, for example, are very good fluoride scavengers and are able effectively to scavenge hydrogen fluoride (HF), arising, for example, in hydrolysis of lithium hexafluorophosphate ($LiPF_6$) by moisture—and to bind it in the form of low-solubility alkaline-earth metal fluorides. Advantageously, alkaline-earth metal carboxylates here are much better fluoride scavengers than alkali metal carboxylates, since alkaline-earth metal fluorides have a much lower solubility in all solvents than do alkali metal fluorides.

By way of example, calcium acetate is able to bind hydrogen fluoride (HF) in the form of a low-solubility, precipitate-forming calcium fluoride ($CaF_2$) in accordance with the following reaction equation:

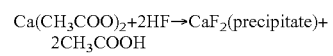

$$Ca(CH_3COO)_2 + 2HF \rightarrow CaF_2(precipitate) + 2CH_3COOH$$

Because of the very good binding capacity of alkaline-earth metal carboxylates for hydrogen fluoride (HF), it is possible, advantageously, to increase the lifetime and cycling life of the cell and also to improve the safety properties of the cell.

The reason for this is that unbound hydrogen fluoride (HF) is able to attack cell materials within the cell, especially active materials of the positive electrode (cathode materials), and casing seals, and may thereby shorten the lifetime and cycling life of the cell. In particular, hydrogen fluoride (HF) may significantly reduce the lifetime and cycling life of cells whose positive electrode comprises as its active material (cathode material) a lithium-manganese spinel (LMO, as for example $LiMn_2O_4$), since the hydrogen fluoride (HF) may result in accelerated dissolution of manganese out of the spinel structure; possible consequences of this are, firstly damage to the active material of the positive electrode (cathode material) and, secondly, the poisoning of the active material of the negative electrode (anode material), graphite for example. The reason for this is that the manganese cations dissolved out of the spinel structure are soluble in the electrolyte and can be transported by the electrolyte to the negative electrode, where they may be reduced to metallic manganese at the active material of the negative electrode (anode material), graphite for example, and in this way may poison the active material of the negative electrode (anode material). It is also possible, furthermore, for the metallic manganese to grow, possibly dendritically, through the separator on the anode side, a phenomenon which could give rise to internal short-circuits. As a result of the fact that the alkaline-earth metal carboxylates are able to bind the hydrogen fluoride (HF), however, these reactions can be lessened or even avoided, and it is possible accordingly to achieve significant increases in the lifetime, the cycling life, and the safety properties of the cell.

Surprisingly, the free carboxylic acid arising as a result of the reaction, acetic acid for example, does not participate in further reactions within the cell, and remains stable. In particular, moreover, carboxylic acids, advantageously, are less aggressive than hydrogen fluoride (HF), and attack even lithium-manganese spinels to far less of an extent or not at all.

Because of the disposition of the protective layer comprising alkaline-earth metal carboxylate between the negative electrode and the positive electrode, the alkaline-earth metal carboxylate is located, first, in a position with a high likelihood of hydrogen fluoride formation, in which the alkaline-earth metal carboxylate is able to carry out direct scavenging of hydrogen fluoride arising. Secondly, the alkaline-earth metal carboxylate is thus located in a position in which it is able to bind manganese cations, dissolved out of a positive electrode active material containing lithium-manganese spinel, before these ions are able even to reach the active material of the negative electrode. In this way, advantageously, a safer cell design can be realized.

Alkaline-earth metal carboxylates, moreover, have positive mechanical and thermal properties. In particular, comminuted alkaline-earth metal carboxylates can still be very crystalline, with possible advantageous consequences for the mechanical properties.

It is possible for the cell to comprise one protective layer comprising alkaline-earth metal carboxylate, or else two or possibly even more protective layers comprising alkaline-earth metal carboxylate.

In principle it is possible for the at least one protective layer, more particularly porous protective layer, comprising alkaline-earth metal carboxylate to be used as a separator, possibly as the sole separator.

For example, the positive electrode and/or the negative electrode may be provided with a protective layer comprising alkaline-earth metal carboxylate. As a result of the positive mechanical and thermal properties of the alkaline-earth metal carboxylate, advantageously, the positive electrode and/or the negative electrode can be stabilized mechanically and thermally.

In one embodiment, therefore, the positive electrode and/or the negative electrode are provided—covered, for example—more particularly on at least one side with a protective layer comprising alkaline-earth metal carboxylate. In this case in particular it is possible for (at least) the positive electrode side facing the negative electrode and/or the negative electrode side facing the positive electrode to be provided, more particularly covered, with a protective layer comprising alkaline-earth metal carboxylate.

It is equally possible, however, for the cell additionally to comprise a separator.

In a further embodiment, therefore, the cell additionally comprises a separator, disposed more particularly between the negative electrode and the positive electrode. The (additional) separator may in particular be a porous membrane. Alternatively or additionally to the positive electrode and/or negative electrode, the separator may be provided—covered, for example, in particular on at least one side with a protective layer comprising alkaline-earth metal carboxylate. As a result of the positive mechanical and thermal properties of the alkaline-earth metal carboxylate, advantageously, the separator can be stabilized mechanically and thermally in this case.

The separator may be provided, more particularly covered, with a protective layer comprising alkaline-earth metal carboxylate on one side or both sides, for example. By way of example it is possible in this case for (at least) the separator side facing the negative electrode and/or the separator side facing the positive electrode to be provided, more particularly covered, with a protective layer comprising alkaline-earth metal carboxylate.

Overall it is possible in this way, by virtue of the at least one protective layer comprising alkaline-earth metal carboxylate, to not only significantly increase the lifetime, the cycling life, and the safety properties of the cell but also to improve significantly the safety properties and especially the intrinsic safety of the cell, particularly under mechanical, thermal and/or electrical stress. Hence it is also possible, advantageously, to provide cells, modules, packs, and batteries that are suitable for the automobile sector.

For example, in comparison with cells having only a polyolefin separator, a significantly higher safety level can advantageously be achieved by virtue of the cell equipped with the at least one protective layer comprising alkaline-earth metal carboxylate.

As compared with cells which have layers comprising sintered ceramics, composed of high-temperature-treated aluminum oxide ($Al_2O_3$), for example, analogous positive results in terms of the safety behavior can be achieved, advantageously, by the at least one protective layer comprising alkaline-earth metal carboxylate.

Alkaline-earth metal carboxylates may be prepared, advantageously, from favorable raw materials and be applied by simple coating technologies. Alkaline-earth metal carboxylates, moreover, may advantageously be nontoxic. Moreover, alkaline-earth metal carboxylates may advantageously have a lower tendency to release carbon dioxide than does calcium carbonate, for example.

For example, the at least one protective layer comprising alkaline-earth metal carboxylate may be produced by single-sided or double-sided coating on a commercial separator and/or on an intercalation electrode, as for example the positive electrode and/or the negative electrode, by means of known coating technologies. In particular here it is possible, advantageously, to avoid a high-temperature synthesis or high-temperature treatment, with possible advantageous consequences both for the materials costs and for the application.

In one further embodiment, the at least one alkaline-earth metal carboxylate has an average particle diameter (mean particle diameter) in a range from $\geq 40$ nm to $\leq 2$ μm, as for example $\geq 40$ nm or $\geq 50$ nm or $\geq 60$ nm or optionally $\geq 100$ nm or optionally $\geq 300$ nm to $\leq 1000$ nm, as for example from $\geq 60$ nm to $\leq 600$ nm. In this way it is possible advantageously to set or attain a porosity of about 30% to 50%. Accordingly it is possible in turn and advantageously to allow the liquid electrolyte to penetrate completely into the pores of the layer. Since, moreover, alkaline-earth metal carboxylates are polar, they can advantageously be well wetted by polar liquid electrolytes, thereby achieving homogeneous distribution of the electrolyte. In this way, overall, it is possible in turn to obtain stable cycling.

In one further embodiment, the at least one protective layer comprising alkaline-earth metal carboxylate has a layer thickness in a range from $\geq 0.5$ μm or $\geq 1$ μm to $\leq 20$ μm, more particularly from $\geq 1$ μm or $\geq 2$ μm to $\leq 7$ μm or $\leq 6$ μm or $\leq 5$ μm, as for example from $\geq 1$ μm to $\leq 5$ μm, as for example of about 3 μm. In this way advantageously it is possible to obtain the specific energy or energy density of the cell in practice.

Calcium has proven advantageous as an alkaline-earth metal cation since it forms a calcium fluoride of very low solubility and, moreover, is inexpensive and eco-friendly.

In one further embodiment, therefore, the at least one protective layer comprising alkaline-earth metal carboxylate comprises at least one calcium carboxylate. The at least one alkaline-earth metal carboxylate may for example be a calcium carboxylate.

Particularly good results have been achievable with calcium acetate ($Ca(CH_3COO)_2$). Calcium acetate, advantageously, is nontoxic and comparatively inexpensive.

In one further embodiment, therefore, the at least one protective layer comprising alkaline-earth metal carboxylate comprises calcium acetate. The at least one alkaline-earth metal carboxylate may be, for example, calcium acetate.

In principle it is possible for the at least one protective layer comprising alkaline-earth metal carboxylate to be formed of—to consist of, for example, the at least one alkaline-earth metal carboxylate.

In another embodiment, however, the at least one protective layer comprising alkaline-earth metal carboxylate further comprises at least one binder.

Insofar as the at least one protective layer comprising alkaline-earth metal carboxylate comprises at least one binder, the protective layer may also be termed a composite layer.

Fluorinated polymers can be used as binders, in particular. Fluorinated polymeric binders may advantageously be extremely stable chemically and electrochemically.

In one specific refinement of this embodiment, therefore, the at least one binder is or comprises a fluorinated polymer. Polyvinylidene fluoride (PVdF), for example, may be used as binder. Other fluorinated polymeric binders can be used as well, such as polytetrafluoroethylene (PTFE) and/or polyvinylidene fluoride-hexafluoropropylene (PVdF-HFP), for example. For example, the copolymer PVdF-HFP can be used. Particularly good results have been obtained, for example, with the product SOLEF21216 from Solvay.

In another embodiment, the at least one protective layer comprising alkaline-earth metal carboxylate further comprises at least one ceramic material. In this way it is possible, advantageously, for the safety properties, and especially the intrinsic safety, of the cell to be improved still further, under mechanical, thermal and/or electrical stress, for example. For example, the at least one ceramic material may be aluminum oxide ($Al_2O_3$).

For example, the at least one protective layer comprising alkaline-earth metal carboxylate may comprise the at least one alkaline-earth metal carboxylate and the at least one ceramic material in the form of a mixture or of what is called a blend. For example, the at least one alkaline-earth metal carboxylate, calcium carboxylate for example, may be blended with at least one ceramic material.

In principle the (additional) separator may be a polymer separator and/or a separator composed of an inorganic material, such as a lithium ion-conducting solid-state electrolyte, for example, and/or a composite separator.

In one further embodiment, however, the separator is a polymer separator. For example, the polymer separator may be a polyolefin separator, and/or a polyimide separator, more particularly a polyolefin separator. Thus it is possible, for example, to make use, advantageously, of a polypropylene separator from Celgard, 2500 for example, which is a standard material and is available in good qualities and at relatively favorable prices.

Where the polymer separator is provided with a protective layer comprising alkaline-earth metal carboxylate, the separator together with the protective layer may also be termed a composite separator.

In one further embodiment, the (additional) separator, polymer separator for example, has a layer thickness in a range from ≥5 μm to ≤50 μm, more particularly of ≥8 μm and ≤30 μm, as for example of about 25 μm. In this way it is possible advantageously to obtain a good energy density and specific energy.

The positive electrode may in particular comprise a lithium intercalation material.

In one further embodiment, therefore, the positive electrode comprises a lithium-manganese spinel and/or a lithiable transition metal oxide. In this way it is possible advantageously to use a material which is standardized on the world market.

The negative electrode may in particular comprise a lithium intercalation material, selected for example from the group consisting of graphite, soft carbons, hard carbons, and mixtures thereof, graphite for example.

The cell, furthermore, may in particular comprise a liquid electrolyte. More particularly, the liquid electrolyte may comprise at least one conductive lithium salt and at least one electrolyte solvent.

The at least one conductive lithium salt here may be selected, for example, from the group consisting of lithium hexafluorophosphate ($LiPF_6$), lithium tetrafluoroborate ($LiBF_4$), lithium bisoxalatoborate, and mixtures thereof.

The liquid electrolyte may for example comprise an approximately 1 molar solution of the at least one conductive lithium salt. For example, the liquid electrolyte may be an approximately 1 molar solution of lithium hexafluorophosphate ($LiPF_6$) in a mixture of organic solvents, such as ethylene carbonate (EC), ethyl methyl carbonate (EMC), diethyl carbonate (DEC), symmetrical and/or asymmetrical ethers.

The at least one electrolyte solvent may be selected more particularly from the group of the organic carbonates, symmetrical ethers, asymmetrical ethers, and mixtures thereof.

Organic carbonates have emerged as being particularly advantageous because they are good solvents for conductive lithium salts. For example, the at least one electrolyte solvent may be selected from the group consisting of ethylene carbonate (EC), dimethyl carbonate (DMC), ethyl methyl carbonate (EMC), diethyl carbonate (DEC), propylene carbonate (PC), vinylene carbonate (VC), and mixtures thereof. In particular the at least one electrolyte solvent may be selected from ethylene carbonate (EC), ethyl methyl carbonate (EMC), diethyl carbonate (DEC), and mixtures thereof. Ethylene carbonate based formulations may advantageously, relative to carbons, be more compatible and more tolerated than propylene carbonate based formulations.

Liquid electrolytes of this kind may advantageously provide sufficient wetting of the porous protective layer comprising at least one alkaline-earth metal carboxylate, and possibly of the (additional) separator, and may fill out the porosity of the protective layer and possibly of the (additional) separator.

Furthermore, the cell may comprise a collector for the negative electrode, referred to as an anode current collector, and a collector for the positive electrode, referred to as a cathode current collector. The collector for the negative electrode (anode current collector) may be made, for example, of copper. The collector for the positive electrode (cathode current collector) may be made, for example, of aluminum.

The lithium cell may be designed, for example, as a so-called pouch cell or softpack cell (a cell with a laminated aluminum foil packaging, more particularly a soft laminated aluminum foil packaging). Alternatively, the lithium cell may be designed as a so-called hardcase cell (a cell having a rigid or hard metal casing, such as a deep-drawn or extruded aluminum casing).

The lithium cell may be a constituent of a lithium cell module composed of two or more lithium cells, and/or of a lithium cell pack composed of two or more lithium cell modules, and/or of a lithium cell battery composed of two or more lithium cells, modules, or packs.

For further technical features and advantages of the lithium cell of the disclosure, reference is hereby made explicitly to the elucidations in connection with the separator of the disclosure, the positive electrode of the disclosure, and the negative electrode of the disclosure, and also to the figures, figure description, and examples.

Further provided by the disclosure are a separator and/or a positive electrode and/or a negative electrode for a lithium cell, having at least one porous protective layer which comprises at least one alkaline-earth metal carboxylate. More particularly the at least one alkaline-earth metal carboxylate may be a calcium carboxylate.

In one embodiment, the at least one protective layer comprising alkaline-earth metal carboxylate further comprises at least one binder. The at least one binder may, for example, comprise or be a fluorinated polymer.

In another embodiment, the at least one protective layer comprising alkaline-earth metal carboxylate has a layer thickness in a range from ≥0.5 μm to ≤20 μm, as for example from ≥1 μm to ≤5 μm.

For further technical features and advantages of the separator of the disclosure, the positive electrode of the disclosure, and the negative electrode of the disclosure, reference is hereby made explicitly to the elucidations in connection with the lithium cell of the disclosure, and also to the figures, figure description, and examples.

BRIEF DESCRIPTION OF THE DRAWINGS

Further advantages and advantageous refinements of the subject matter of the disclosure are illustrated by the drawings and elucidated in the description below. Here it should be taken into account that the drawings have only a descriptive character and are not intended to restrict the disclosure in any form.

DETAILED DESCRIPTION

Figure 1:
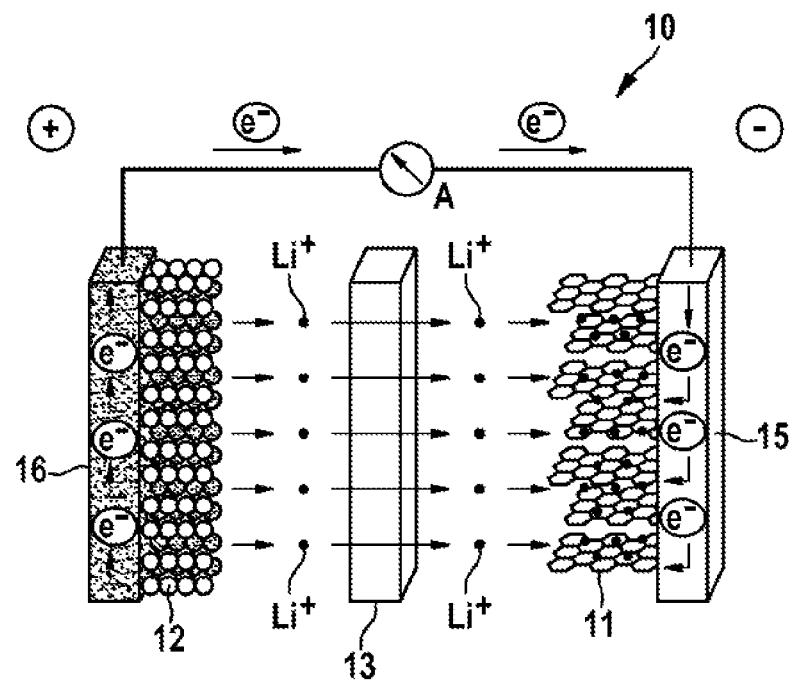
FIG. 1 shows a diagrammatic cross section through one embodiment of a cell of the disclosure during charging.

FIG. 1 shows one embodiment of an inventive cell 10, i.e., of a galvanic element, during charging. In this embodiment the cell 10 is a lithium-ion cell. FIG. 1 shows that the cell 10 comprises a negative electrode 11 and a positive electrode 12. FIG. 1 further shows that the negative electrode 11 and the positive electrode 12 are separated by a porous protective layer 13, a composite layer for example, which has at least one alkaline-earth metal carboxylate or salt of a carboxylic acid with a cation of the second main group. The space between the negative electrode 11 and the positive electrode 12, and also the pores of the porous protective layer 13, are filled here with an electrolyte which conducts lithium ions Li$^+$. The negative electrode 11 here comprises graphite ($C_6$, $Li_xC_6$) as active material, and the positive electrode 12 here comprises a lithium metal oxide ($LiM_yO_z$, $Li_{(1-x)}M_yO_2$) as active material.

FIG. 1 illustrates how during charging, lithium ions Li$^+$ are deintercalated or removed from the active material of the positive electrode 12 and diffuse through the protective layer 13 to the active material of the negative electrode 11, where they are intercalated or inserted.

This charging operation of the lithium-ion cell 10 can be reproduced, for example, by the following formula:

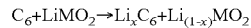
$$C_6 + LiMO_2 \rightarrow Li_xC_6 + Li_{(1-x)}MO_2$$

FIG. 1 additionally illustrates how, during charging, electrons e$^-$ migrate from the positive electrode 12 to the negative electrode 11, with a current flow being measurable by an ammeter A.

Figure 2:
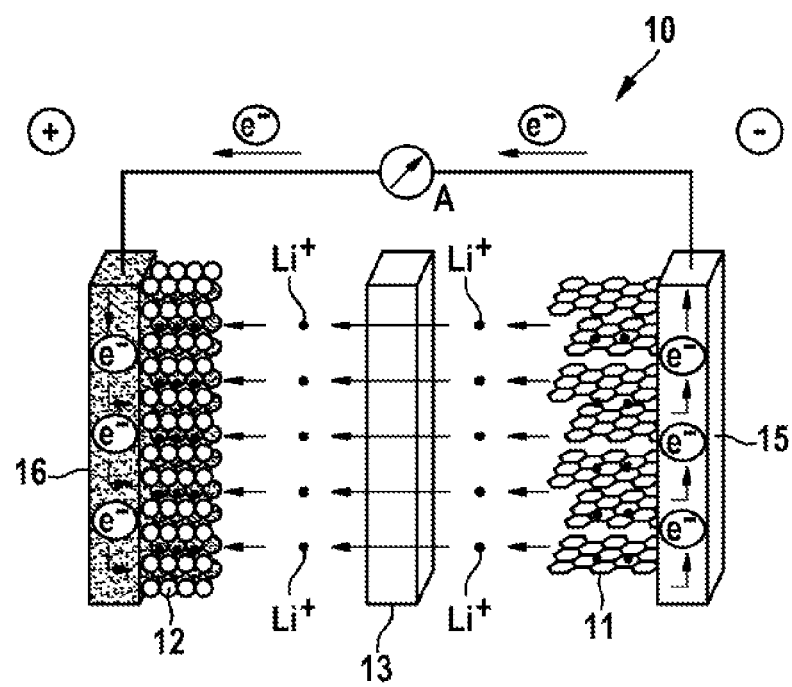
FIG. 2 shows a diagrammatic cross section through the cell shown in FIG. 1 during discharging.

FIG. 2 shows the cell 10 shown in FIG. 1, during discharging.

FIG. 2 illustrates how during discharging, lithium ions Li$^+$ are deintercalated or removed from the active material of the negative electrode 11 and diffuse through the protective layer 13 to the active material of the positive electrode 12, where they are intercalated or inserted.

This discharge operation of the lithium-ion cell 10 can be reproduced, for example, by the following formula:

$$Li_xC_6 + Li_{(1-x)}MO_2 \rightarrow C_6 + LiMO_2$$

FIG. 2 further illustrates how, during discharging, electrons e$^-$ migrate from the negative electrode 11 to the positive electrode 12, with a current flow, in the opposite direction to that during charging, being measurable by an ammeter A.

FIGS. 1 and 2 show, furthermore, that the negative electrode 11 has an anode current collector 15, made of copper, for example, and the positive electrode 12 has a cathode current collector, made of aluminum, for example.

Figure 3:
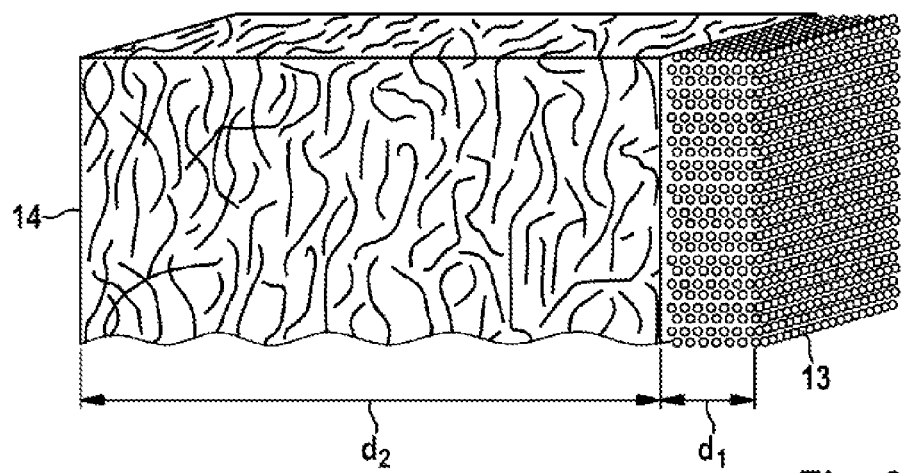
FIG. 3 shows a diagrammatic, perspective section of one embodiment of a separator of the disclosure.

FIG. 3 shows a diagrammatic, perspective section of one embodiment of an inventive separator 13, 14. FIG. 3 illustrates how the separator 13, 14 is a composite separator composed of a porous separator (core separator) 14, made of porous polyethylene (PE separator), for example, and a protective layer 13, composite layer for example, with hydrogen fluoride (HF) scavenger quality, composed of alkaline-earth metal carboxylate particles, such as of calcium acetate particles, for example, and a binder. FIG. 3 shows that the protective layer or composite layer 13 is applied to one side of the separator (core separator) 14.

FIG. 3 illustrates how the protective layer 13 has a protective layer thickness $d_1$ of approximately 3 μm, for example, and the separator (core separator) 14, a PE separator, for example, has a layer thickness $d_2$, of approximately 25 μm, for example.

FIGS. 4 to 7 show diagrammatic cross sections through further embodiments of inventive lithium cells 10. The cells 10 may be lithium-ion cells or lithium metal cells, more particularly lithium-ion cells.

FIGS. 4 to 7 show that the cells 10 comprise a negative electrode 11, a positive electrode 12, and at least one porous protective layer 13 disposed between the negative electrode 11 and the positive electrode 12, the protective layer 13 comprising at least one alkaline-earth metal carboxylate.

FIGS. 4 to 7 additionally show that the negative electrode 11 has an anode current collector 15, made of copper, for example, and the positive electrode 12 has a cathode current collector, made of aluminum, for example.

Figure 4:
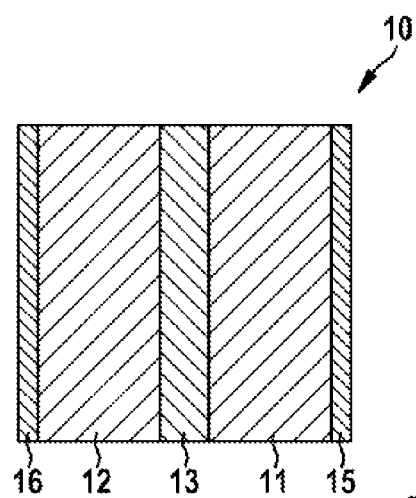
FIGS. 4-7 show diagrammatic cross sections through further embodiments of cells of the disclosure.

Provided in the embodiment shown in FIG. 4 is a protective layer 13 which 13 serves as the sole separator. The protective layer 13 here may be applied to the negative electrode 11 side facing the positive electrode 12 and/or to the positive electrode 12 side facing the negative electrode 11, or may be inserted between the electrodes 11, 12.

Figure 5:
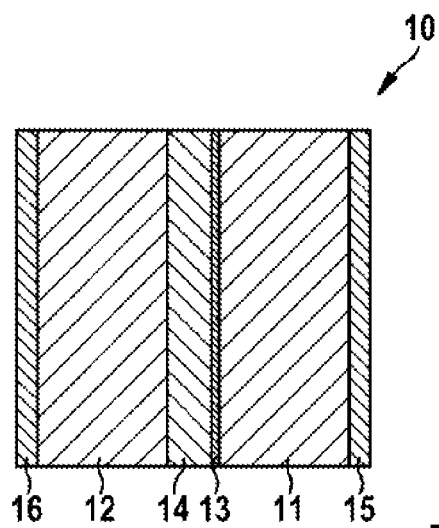
Figure 6:
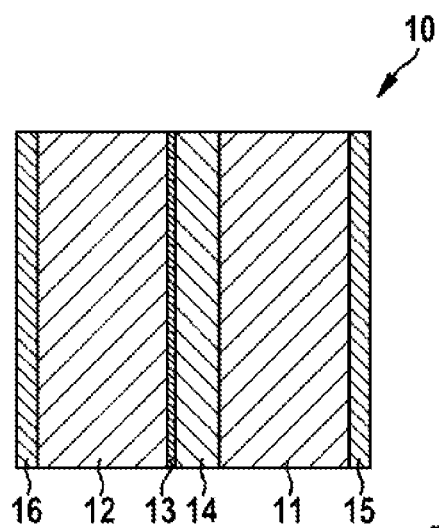
Figure 7:
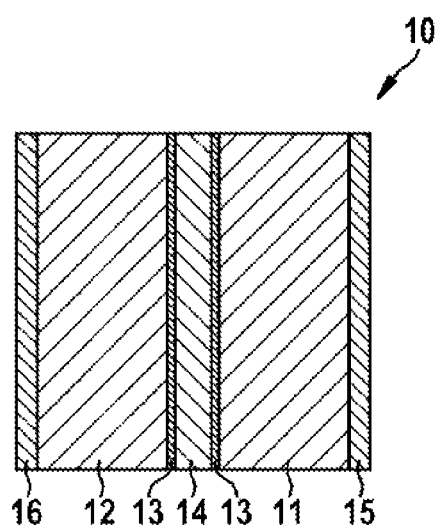

In the embodiment shown in FIGS. 5 to 7, a separator 14, a polymer separator for example, is additionally disposed between the negative electrode 11 and the positive electrode 12.

Provided in the embodiment shown in FIG. 5 is a protective layer 13 which 13 is disposed between the negative electrode 11 and the separator 14. The protective layer 13 here may be applied to the separator 14 side facing the negative electrode 11 and/or to the negative electrode 11 side facing the separator 14, or may be inserted between the negative electrode 11 and the separator 14.

Provided in the embodiment shown in FIG. 6 is a protective layer 13 which 13 is disposed between the positive electrode 12 and the separator 14. The protective layer 13 here may be applied to the separator 14 side facing the positive electrode 12 and/or to the positive electrode 12 side facing the separator 14, or may be inserted between the positive electrode 12 and the separator 14.

In the embodiment shown in FIG. 7, two protective layers 13 are provided, of which 13 one is disposed between the negative electrode 11 and the separator 14, and the other between the positive electrode 12 and the separator 14. The protective layers 13 in this case may be applied on both sides or one side of the separator 14 and/or of the negative electrode 11 side facing the separator 14 and/or of the positive electrode 12 side facing the separator 14, or may be inserted between the negative electrode 11 and the separator 14 or between the positive electrode 12 and the separator 14, respectively.

Working Examples

1. Production of the Reference Cells with PE Separator without Coating (Variant A)

Ten lithium-ion cells are assembled, each with a polyethylene separator (PE separator) 25 µm thick.

In this case the positive electrode comprises as its active material a 50:50 mixture of lithium cobalt oxide ($LiCoO_2$) and lithium nickel cobalt manganese oxide ($LiNi_{0.33}Co_{0.33}Mn_{0.33}O_2$), and the negative electrode comprises synthetic graphite (MCMB 6-28; from Osaka Gas, Japan). The nominal capacity is 40 Ah. The 100% state of charge (SOC) of the cell is 4.20 V.

2. Production of the Inventive Cells: PE Separator with Double-Sided $Ca(CH_3COO)_2$ Based Protective Layer (Variant B)

Ten lithium-ion cells are assembled, each with a polyethylene separator (PE separator) 25 µm thick, coated on both sides with a protective layer 5 µm thick and containing calcium acetate ($Ca(CH_3COO)_2$).

The positive electrode comprises as its active material a 50:50 mixture of lithium cobalt oxide ($LiCoO_2$) and lithium nickel cobalt manganese oxide ($LiNi_{0.33}Co_{0.33}Mn_{0.33}O_2$), and the negative electrode comprises synthetic graphite (MCMB 6-28; from Osaka Gas, Japan). The nominal capacity is 40 Ah. The 100% state of charge (SOC) of the cell is 4.20 V.

3. Safety Tests

Safety tests in accordance with the Sandia report 2005-3123 (Freedom CAR, Electrical Energy Storage System, Abuse Test Manual for Electric and Hybrid Electrical Vehicle Applications) are carried out.

3.1 Nail Penetration Tests

Nail penetration tests are carried out on the reference lithium-ion cells and on the inventive lithium-ion cells at 100% state of charge (SOC) (parameters: 3 mm nail diameter, penetration velocity: 8 cm/sec). The cells are penetrated completely in the Z-direction, in other words perpendicularly to the largest external surface of the cell.

The respective results are evaluated and divided among what are called the EUCAR levels.

Table 1 reproduces the corresponding results of the nail penetration test. In each case ten lithium-ion cells per variant A and B, respectively, are tested.

| Variant | Number of cells EUCAR LEVEL 3 (Loss of electrolyte mass <50%) | Number of cells EUCAR LEVEL 4 (Loss of electrolyte mass >50%) | Number of cells EUCAR LEVEL 5 (Fire or flames) |
| --- | --- | --- | --- |
| A | 8 | 1 | 1 |
| B | 10 | 0 | 0 |

The invention claimed is:

1. A lithium cell, comprising:
   a negative electrode;
   a positive electrode; and
   at least one porous protective layer disposed between the negative electrode and the positive electrode, the at least one protective layer comprising a particle form of at least one alkaline-earth metal carboxylate in a porous portion of the at least one porous protective layer.

2. The lithium cell of claim 1, wherein the at least one protective layer comprises at least one binder.

3. The lithium cell of claim 1, wherein the at least one alkaline-earth metal carboxylate has an average particle diameter in a range from ≥40 nm to ≤2 µm.

4. The lithium cell of claim 1, wherein the at least one protective layer has a layer thickness in a range from ≥0.5 µm to ≤20 µm.

5. The lithium cell of claim 1, wherein the at least one protective layer includes at least one calcium carboxylate.

6. The lithium cell of claim 2, wherein the at least one binder includes a fluorinated polymer.

7. The lithium cell of claim 1, wherein:
   the at least one protective layer further comprises at least one ceramic material, and
   the at least one alkaline-earth metal carboxylate and the at least one ceramic material are in the form of a mixture.

8. The lithium cell of claim 1, further comprising a separator disposed between the negative electrode and the positive electrode.

9. The lithium cell of claim 8, wherein at least one of the separator, the positive electrode, and the negative electrode is covered with the at least one protective layer.

10. The lithium cell of claim 8, wherein the separator is covered, on one side or both sides with the at least one protective layer.

11. The lithium cell of claim 8, wherein the separator is a polymer separator.

12. The lithium cell of claim 1, wherein the positive electrode comprises a lithium-manganese spinel.

13. An electrode for a lithium cell, comprising:
   at least one porous protective layer including a particle form of at least one alkaline-earth metal carboxylate in a porous portion of the at least one porous protective layer.

14. The electrode of claim 13, wherein the at least one protective layer further includes at least one binder.

15. The electrode of claim 13, wherein the at least one protective layer has a layer thickness in a range from $\geq 0.5$ μm to $\leq 20$ μm.

16. The lithium cell of claim 5, wherein the at least one calcium carboxylate is calcium acetate.

17. The lithium cell of claim 11, wherein the separator is a polyolefin separator.

18. The electrode of claim 13, wherein the at least one alkaline-earth metal carboxylate is calcium carboxylate.

19. The electrode of claim 14, wherein the at least one binder is a fluorinated polymer.

20. A separator for disposing between a negative electrode and a positive electrode of a lithium cell, the separator comprising:
   at least one porous protective layer including a particle form of at least one alkaline-earth metal carboxylate in a porous portion of the at least one porous protective layer.

* * * * *